UNITED STATES PATENT OFFICE.

WALTER O. SNELLING, OF ALLENTOWN, PENNSYLVANIA.

PREPARATION OF COLLOID BODIES.

1,305,946.　　　　Specification of Letters Patent.　　Patented June 3, 1919.

No Drawing.　　　Application filed August 14, 1917.　　Serial No. 186,210.

*To all whom it may concern:*

Be it known that I, WALTER O. SNELLING, a citizen of the United States, and a resident of Allentown, in the county of Lehigh and State of Pennsylvania, have invented a new and useful Improvement in the Preparation of Colloid Bodies, of which the following is a specification.

My invention relates to the preparation of colloided bodies from nitrostarch, and more particularly relates to a new and improved means for preparing smokeless powder from nitrostarch, without the use of a volatile solvent.

I have found that by thoroughly mixing granules of nitrostarch at a low temperature with an agent that only slowly colloids the nitrostarch at the temperature employed, so as to obtain an intimate mixture of the colloiding agent and the nitrostarch, but without bringing about material colloidization, and then heating the thoroughly mixed materials at a temperature at which active colloidization of the nitrostarch granules is brought about, I can obtain a colloid which is suitable for use as smokeless powder, and which possesses material advantages over such nitrostarch colloids as have previously been prepared. Instead of the brittle and very fragile colloids that others have obtained from nitrostarch, I obtain by my process a colloid which burns with great uniformity, and is sufficiently tough to withstand the high pressures which are used in modern gunnery, without breaking up or crushing, or leading to erratic ballistic results.

Where I employ a relatively large amount of colloiding agent, in proportion to the amount of nitrostarch used, the colloidization extends completely through the nitrostarch granules, and where I employ a relatively small amount of colloiding agent, in conjunction with the use of a relatively large amount of nitrostarch, I obtain only the superficial colloidization of the nitrostarch granules. I find this superficial colloidization of nitrostarch granules to be of advantage in the preparation of certain types of smokeless powder, but I do not claim the process of bringing about the superficial colloidization of nitrostarch granules before being pressed into pellets or the like in this present application, since this is covered in my co-pending application S. N. 186209 filed August 14, 1917.

As an example of my present invention, I may take 85 parts of nitrostarch of 12.80% N and thoroughly incorporate with it in the cold 15 parts of liquid trinitrotoluene. By effecting the mixing at a temperature not exceeding about 20° to 25° C., and preferably at the lower figure and bringing about the mixing in not over fifteen to twenty minutes, there will be comparatively little colloidization of the nitrostarch, the liquid trinitrotoluene being merely spread over the surfaces of the nitrostarch granules. If now the thoroughly incorporated mixture is heated at a temperature of 80° C. for fifteen minutes, or is heated for a longer period of time at a lower temperature, the liquid trinitrotoluene which is on the surface of each granule of nitrostarch will bring about active colloidization, and the mass will become cemented together to form a very tough colloid. In practising my invention I prefer to mix nitrostarch granules with an agent which does not colloid same to any material extent at a low temperature, but which does colloid the nitrostarch at an elevated temperature, and bring about a thorough mixing of the two materials at a temperature not exceeding 20° C. to 25° C. I next force the well-mixed product by means of suitable pressure into pellets, or otherwise form it into any desired shape, after which the product so prepared is subjected to gentle heating, preferably at a temperature of 60° C. to 90° C., and for a period of time varying from ten minutes to several hours, according to the extent to which colloidization is desired, and the per cent. of the colloidizing agent which is present.

While I have described in the specific example given above, the application of my process to the preparation of one type of colloided body from nitrostarch, it is to be understood that my process may also be practised with equal success in other ways, and therefore no limitations are to be imposed upon my invention except such as are indicated in the appended claims.

I claim as my invention:

1. In the manufacture of colloids, the process which comprises mixing with nitrostarch an agent which does not colloid the nitrostarch during the period of mixing in the cold, and subsequently causing the agent to bring about the colloidization of the nitrostarch.

2. In the manufacture of colloids, the process which comprises mixing with nitrostarch an agent which does not colloid the nitrostarch during the period of mixing in the cold, but which will colloid the nitrostarch at an elevated temperature, and subsequently heating to bring about the colloidization of the nitrostarch.

3. In the manufacture of colloids, the process which comprises adding to nitrostarch an agent which does not colloid the nitrostarch during the period of mixing in the cold, but which will colloid the nitrostarch at an elevated temperature, mixing to thoroughly incorporate the two materials, forming the mixture into any desired shape while the nitrostarch is still substantially uncolloided, and subsequently bringing about the colloidization of the nitrostarch.

4. In the manufacture of smokeless powder, the process which comprises mixing 85 parts of nitrostarch with 15 parts of liquid trinitrotoluene in the cold, forming the substantially uncolloided mixture into any desired shape, and subsequently bringing about the colloidization of the nitrostarch.

5. In the manufacture of smokeless powder, the process which comprises mixing 85 parts of nitrostarch with 15 parts of liquid trinitrotoluene in the cold, forming the substantially uncolloided mixture into any desired shape, and subsequently heating to bring about the colloidization of the nitrostarch.

In testimony whereof I have hereunto subscribed my name this 13th day of August, 1917.

WALTER O. SNELLING.